United States Patent
Mehring

(10) Patent No.: US 8,572,978 B2
(45) Date of Patent: Nov. 5, 2013

(54) FUEL INJECTOR AND AERODYNAMIC FLOW DEVICE

(75) Inventor: Carsten Ralf Mehring, Ladera Ranch, CA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 1323 days.

(21) Appl. No.: 12/572,304

(22) Filed: Oct. 2, 2009

(65) Prior Publication Data

US 2011/0079013 A1   Apr. 7, 2011

(51) Int. Cl.
*F02C 1/00* (2006.01)

(52) U.S. Cl.
USPC .......................................................... 60/740

(58) Field of Classification Search
USPC .................... 60/740, 742, 746–748; 239/399, 239/403, 533.2
See application file for complete search history.

(56) References Cited

U.S. PATENT DOCUMENTS

| | | | |
|---|---|---|---|
| 2,780,061 A * | 2/1957 | Clarke et al. | 60/740 |
| 3,531,937 A * | 10/1970 | Sneeden | 60/738 |
| 4,051,670 A | 10/1977 | Pierce | |
| 4,512,158 A | 4/1985 | Striebel et al. | |
| 4,914,918 A | 4/1990 | Sullivan | |
| 5,069,033 A | 12/1991 | Shekleton | |
| 5,195,315 A | 3/1993 | Holladay | |
| 5,579,645 A * | 12/1996 | Prociw et al. | 60/740 |
| 5,966,937 A | 10/1999 | Graves | |
| 6,955,053 B1 * | 10/2005 | Chen et al. | 60/804 |
| 6,986,255 B2 | 1/2006 | Smith et al. | |
| 7,137,255 B2 | 11/2006 | Schmotolocha et al. | |
| 7,168,236 B2 | 1/2007 | Schmotolocha et al. | |
| 7,278,256 B2 | 10/2007 | Norris et al. | |
| 7,596,950 B2 * | 10/2009 | Woltmann et al. | 60/765 |
| 8,196,410 B2 * | 6/2012 | Patel et al. | 60/740 |
| 2006/0032231 A1 * | 2/2006 | Andersson et al. | 60/765 |
| 2011/0072823 A1 * | 3/2011 | Chen et al. | 60/742 |

* cited by examiner

*Primary Examiner* — Phutthiwat Wongwian
(74) *Attorney, Agent, or Firm* — Carlson, Gaskey & Olds, P.C.

(57) ABSTRACT

A gas turbine engine includes a reverse flow annular combustor having a liner with opposing ends. One end includes apertures configured to receive compressed air, and an outlet is provided at the other end and is configured to connect to a turbine nozzle. A fuel injector extends through the liner at a base and axially between the apertures and the outlet. The fuel injector includes a housing extending from the base to a dome and provides an exterior surface surrounding an injector cavity. The exterior surface has forward and rearward surfaces respectively facing the apertures and the outlet and provides shapes that are different than one another to influence and improve the aerodynamic flow field of the gas mixture (i.e., air, fuel and combustion-products) within the combustor volume.

15 Claims, 3 Drawing Sheets

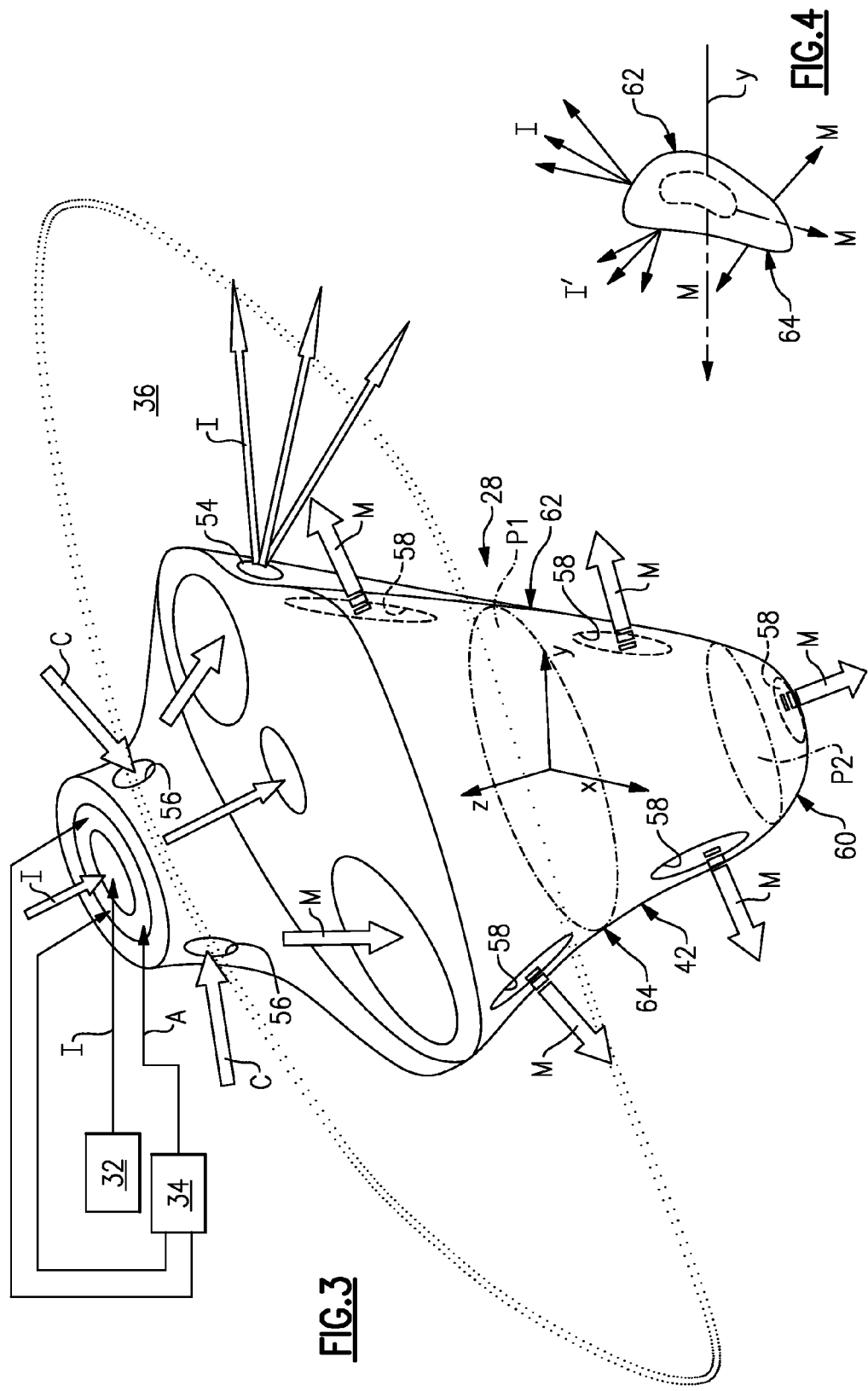

FUEL INJECTOR AND AERODYNAMIC FLOW DEVICE

This invention was made with government support with the United States Navy under Contract No.: N00019-06-C-0081. The government therefore has certain rights in this invention.

BACKGROUND

Gas turbine engines use fuel injectors to inject fuel into a combustor. One type of fuel injector atomizes highly pressurized fuel through a small orifice into the combustion chamber. Another type of fuel injector atomizes fuel at a low pressure using shear forces provided by a gas stream surrounding the injected fuel stream as it enters the combustion chamber. Both types of fuel injectors are designed for the sole purpose of atomizing fuel within the combustion chamber.

There are a variety of combustor configurations, including a reverse flow annular combustor. Reverse flow annular combustors include a liner dividing a combustion chamber, into axially co-flowing exterior (cold, non-combusting) and interior (hot, combusting) annular flows. Apertures and holes are provided in the liner wall to allow cold compressed air (exterior annular flow) into the inner annular section of the combustion chamber, where under admission of fuel a combustion process takes place. An outlet is provided at the end of the inner annular flow path which is connected to a turbine nozzle. The fuel injectors typically include a cylindrical shaped housing having a hemispherical domed end, which extend from the outer annular flow path through the liner and into the inner annular flow path of the combustion chamber. The flow path interior to the liner extends from the liner apertures and holes to the outlet end of the inner annulus such that a considerable amount of gases must flow past the fuel injector housing. The presence of the fuel injector volumes and its effects on the internal combustor aerodynamics can create hotspots and result in undesirable flow and temperature patterns within the combustion volume, i.e., annular/toroidal volume interior to the combustor liner.

SUMMARY

A gas turbine engine includes a reverse flow annular combustor having a liner with opposing ends. One end includes apertures configured to receive compressed air. An outlet is provided at the other end and is configured to connect to a turbine nozzle. A fuel injector extends through the liner at a base and axially between the apertures and the outlet. The fuel injector includes a housing extending from the base to a dome and provides an exterior surface surrounding an injector cavity. The exterior surface has forward and rearward surfaces respectively facing the apertures and the outlet that provide shapes that are different than one another.

These and other features of the disclosure can be best understood from the following specification and drawings, the following of which is a brief description.

BRIEF DESCRIPTION OF THE DRAWINGS

FIG. 3 partial perspective view of a fuel injector with the reverse annular flow combustor shown in FIG. 2.

FIG. 4 is a top elevational view in the z direction of the fuel injector shown in FIG. 2.

DETAILED DESCRIPTION

Figure 1:
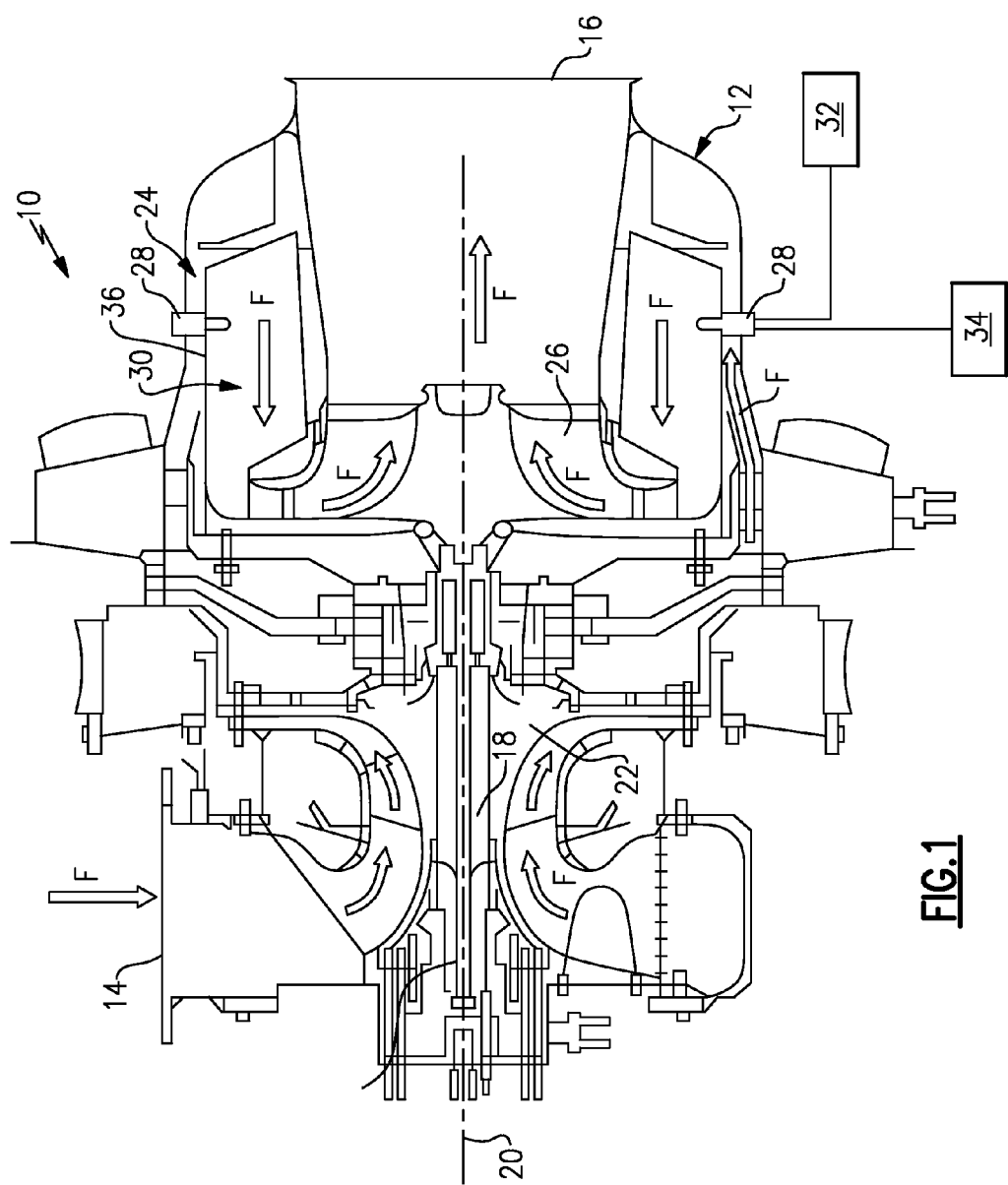
FIG. 1 is a schematic cross-sectional view of a gas turbine engine for an auxiliary power system.
Figure 2:
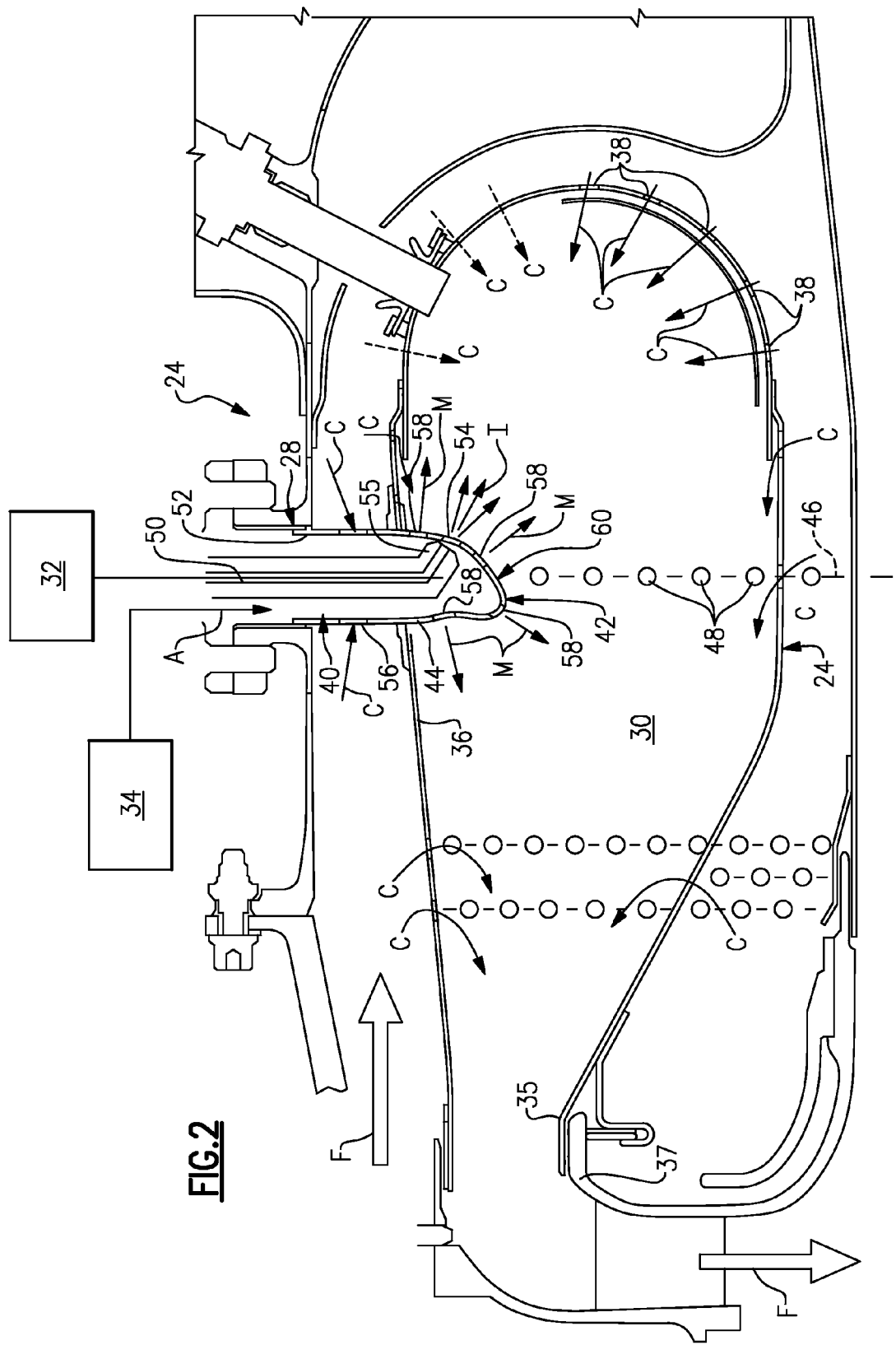
FIG. 2 is a cross-sectional view of a reverse flow annular combustor.

A gas turbine engine 10 for an auxiliary power system is schematically illustrated in FIG. 1. The engine 10 includes a housing 12 providing an inlet 14 and an outlet 16. A fluid flow path F flows from the inlet 14 to the outlet 16. A compressor 22 and a turbine 26 are supported on a shaft 18 for rotation about an axis 20. The compressor 22 draws air in from the inlet 14 and provides compressed air C to a combustor 24, as shown in FIGS. 2 and 3. Fuel I from a fuel source 32 is injected into the volume interior to the liner 36 and mixed with the compressed air C and air A from another air source to provide a fuel-air mixture M, for example.

Referring to FIG. 2, the combustor 24 is a reverse annular flow combustor in which a wall or liner 36 is provided that defines a combustion volume 30, which has axially opposing ends. Apertures 38 and holes 48 are provided along the liner surface, i.e., length of the liner and at the dome-end of the liner 36 to allow compressed air C (less the compressed air C flowing through the injector and used for fuel atomization) into the combustion volume 30. Apertures 38 and holes 48 within the liner 36 are placed to achieve a certain aerodynamic flow pattern within the combustor 24 and to provide adequate fuel-air mixing, combustion staging and liner cooling. Combustion products and dilution air exit the combustor volume 30 through an outlet 35 provided at the other end and which is connected to a turbine nozzle 37. The turbine nozzle 37 supplies the combustion gases to the turbine 26, which rotationally drives the shaft 18 as the gases expand in the turbine 26.

Multiple fuel injectors 28 are arranged about the circumference of the combustor 24. The fuel injectors 28 include a housing 40 extending radially (z direction in FIG. 3) through an opening 44 in the liner 36 and terminating in a dome 42. The injector housing 40 is arranged axially (y direction in FIG. 3) between the liner dome region with apertures 38 and the outlet 35 at an outer diameter of the liner 36. In one particular application, a quick quench plane 46 is generally axially aligned with the injector housing 40 and is provided by quenching holes 48 that introduce some of the compressed air C into the combustion volume or liner interior 30.

A nozzle 55 is disposed within an injector cavity provided by the housing 40 and is in fluid communication with a fuel passage 50 supplied by the fuel source 32. Fuel I is sprayed through an outlet in the nozzle 55 and through an aligned fuel injection opening 54 in a forward surface 62 of the housing 40. The housing 40 also provides an air passage 52 to supply air A from the other air source 34 which may be pressurized air used to overcome pressure losses. The air passage 52 also cools the injector 28. It should be understood that compressed air C may be provided through the air passage 52 instead of or together with air from a separate air source. Compressed air C can also be provided through air inlets 56 on a portion of the housing 40 external to the liner 36. Air A and compressed air C intermix within the housing 40 and are provided as a mixture M to the combustions volume 30 through air injection openings 58 in the housing 40. Alternatively, some of air A or some compressed air C or some of the air mixture M can be used to assist in the atomization of the fuel by being expelled in an annulus surrounding the fuel at the exit 54.

The air injection openings 58 might be of different shapes (i.e., slits, circular holes, ovals, with or without material features on the injector housing such as swirls) and are positioned to provide desired aerodynamic flow patterns and mixing within the combustion volume 30. This functionality is distinctly different and in addition to the functionality of the injector as fuel preparation and atomization device. For example, the domes surface 60 may include an air injection opening 58 facing radially inward to affect aerodynamic flow behavior and fuel/air mixture fraction values just below the injector. The air injection openings 58 on the forward surface 62 can enhance mixing of the fuel I entering the combustion volume 30. For example, the air injection openings 58 on a rearward surface 64 facing the outlet end 35 (leftmost holes in FIG. 2, not shown in FIG. 3) as well as the radially inward-pointing openings 58 on the injector dome surface 60 can reduce hotspots axially behind (left side) the fuel injector 28. Typically, a fuel-rich flame extends axially toward the outlet end 35 directly behind the fuel injector 28 in prior art arrangements, resulting in a large temperature gradient at the combustor exit and along the liner 36 that reduces life of the turbine nozzle 37 and the liner 36.

As best seen in FIGS. 3 and 4, the shape of the housing 40 is not cylindrical and is designed to provide an advantageous aerodynamic effect on gases and fuel flowing within the combustion liner 30 towards the exit 35. Additionally, the housing 40 is not frustoconical in shape. The housing 40 may be shaped like a radially extending, tapered airfoil, as shown by the top plane, or base, intersecting the liner 36, as illustrated in the example. Said another way, the housing 40 (see FIG. 2) or 42 (see FIG. 3) includes a generally tear-drop shape in which the housing 40 tapers toward the domed surface 60, as planes P1 and P2 illustrate. Other applications might call, however, for a bell-shape (inversed tear-drop) or hourglass shape. The forward/rearward and dome surfaces 62, 64, 60 of the fuel injectors 28 are designed to provide adequate discharge locations for the air injection openings 58, improve the liner-internal aerodynamics, and influence the liner-internal aerodynamics directly by their mere presence within the combustion volume 30. In this manner, the fuel injector 28 enhances the flow within the combustion chamber 30 in addition to delivering fuel.

Although example embodiments have been disclosed, a worker of ordinary skill in this art would recognize that certain modifications would come within the scope of the claims. This includes the addition of multi-fuel outlet ports with fuel discharge into different general directions for the purposes of multi-staged combustion. For that reason, the following claims should be studied to determine their true scope and content.

What is claimed is:

1. A fuel injector for a gas turbine engine comprising:
   a housing including a base that extends to a dome and providing an exterior surface surrounding an injector cavity, the exterior surface including forward and rearward surfaces opposite one another, and each of the forward and rearward surfaces providing a shape, the shapes different than one another; and
   a fuel nozzle disposed within the injector cavity, wherein the fuel nozzle includes a fuel passage including an outlet, the exterior surface including a fuel injection opening aligned with the outlet and an air injector opening offset from the fuel injection opening.

2. The fuel injector according to claim 1, wherein the fuel injection opening is arranged on the forward surface.

3. The fuel injector according to claim 1, wherein the air injection opening is arranged on at least one of the rearward and forward surfaces.

4. The fuel injector according to claim 1, wherein an air injection opening is arranged on the dome.

5. The fuel injector according to claim 1, wherein at least one of the forward and rearward surfaces includes at least one of a slit, circular hole, oval hole and swirl.

6. A fuel injector for a gas turbine engine comprising:
   a housing including a base that extends to a dome and providing an exterior surface surrounding an injector cavity, the exterior surface including forward and rearward surfaces opposite one another, and each of the forward and rearward surfaces providing a shape, the shapes different than one another, wherein the exterior surface is shaped like a tapered airfoil, tapering from the base to the dome; and
   a fuel nozzle disposed within the injector cavity.

7. The fuel injector according to claim 6, wherein the forward surface is concave and the rearward surface is convex.

8. A gas turbine engine comprising:
   a reverse flow annular combustor including a liner having opposing ends, with one end including apertures configured to receive compressed air and an outlet provided at the other end configured to connect to a turbine nozzle;
   a fuel injector extending through the liner at a base and axially between the apertures and the outlet, the fuel injector including a housing having the base which extends to a dome and providing an exterior surface surrounding an injector cavity, the exterior surface including forward and rearward surfaces respectively facing the apertures and the outlet, and each of the forward and rearward surfaces provide a shape, the shapes different than one another;
   a fuel nozzle disposed within the injector cavity and providing a fuel passage, and the housing providing an air passage in fluid communication with an air source; and
   a compressor arranged upstream from the combustor and configured to provide compressed air, the compressor different than the air source.

9. A gas turbine engine comprising:
   a reverse flow annular combustor including a liner having opposing ends, with one end including apertures configured to receive compressed air and an outlet provided at the other end configured to connect to a turbine nozzle;
   a fuel injector extending through the liner at a base and axially between the apertures and the outlet, the fuel injector including a housing having the base which extends to a dome and providing an exterior surface surrounding, an injector cavity, the exterior surface including forward and rearward surfaces respectively facing the apertures and the outlet, and each of the forward and rearward surfaces providing a shape, the shapes different than one another; and
   a fuel nozzle disposed within the injector cavity and including a fuel passage having an outlet, the exterior surface including a fuel injection opening aligned with the outlet and an air injector opening offset from the fuel injection opening.

10. The gas turbine engine according to claim 9, wherein the fuel injection opening is arranged on the forward surface.

11. The gas turbine engine according to claim 9, wherein the air injection opening is arranged on at least one of the rearward and forward surfaces.

12. The gas turbine engine according to claim 9, wherein an air injection opening is arranged on the dome.

13. The gas turbine engine according to claim 9, wherein at least one of the forward and rearward surfaces includes at least one of a slit, circular hole, oval hole and swirl.

14. A gas turbine engine comprising:
a reverse flow annular combustor including a liner having opposing ends, with one end including apertures configured to receive compressed air and an outlet provided at the other end configured to connect to a turbine nozzle; and
a fuel injector extending through the liner at a base and axially between the apertures and the outlet, the fuel injector including a housing having the base which extends to a dome and providing an exterior surface surrounding an injector cavity, the exterior surface including forward and rearward surfaces respectively facing the apertures and the outlet, and each of the forward and rearward surfaces providing a shape, the shape different than one another, wherein the exterior surface is shaped like a tapered airfoil, tapering from the base to the dome.

15. The gas turbine engine according to claim 14, wherein the forward surface is concave and the rearward surface is convex.

* * * * *